(12) United States Patent
Toba

(10) Patent No.: US 8,764,103 B2
(45) Date of Patent: Jul. 1, 2014

(54) FRONT PORTION STRUCTURE OF VEHICLE BODY

(71) Applicant: Honda Motor Co., Ltd, Tokyo (JP)

(72) Inventor: Yoshiyuki Toba, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/779,019

(22) Filed: Feb. 27, 2013

(65) Prior Publication Data

US 2013/0264843 A1 Oct. 10, 2013

(30) Foreign Application Priority Data

Apr. 5, 2012 (JP) .................................. 2012-086461

(51) Int. Cl.
*B62D 25/20* (2006.01)

(52) U.S. Cl.
USPC .......... 296/193.09; 296/204; 296/70; 296/75; 296/209; 296/187.09

(58) Field of Classification Search
USPC ............. 296/187.04, 75.209, 193.09, 203.02, 296/187.01, 197.03, 75, 70, 204, 209
See application file for complete search history.

(56) References Cited

U.S. PATENT DOCUMENTS

| | | | | | |
|---|---|---|---|---|---|
| 2,748,838 | A | * | 6/1956 | Scholl | 297/423.41 |
| 2,810,672 | A | * | 10/1957 | Taylor | 428/138 |
| 3,047,088 | A | * | 7/1962 | Murrell | 180/90.6 |
| 3,860,284 | A | * | 1/1975 | Lichtig | 296/75 |
| 5,884,963 | A | * | 3/1999 | Esposito et al. | 296/187.09 |
| 6,224,133 | B1 | * | 5/2001 | Abramoski et al. | 296/75 |
| 6,283,529 | B2 | * | 9/2001 | Kitagawa | 296/75 |
| 6,547,318 | B2 | * | 4/2003 | Takeuchi | 296/204 |
| 6,634,694 | B2 | * | 10/2003 | Matsushita | 296/75 |
| 6,761,389 | B2 | * | 7/2004 | Akasaka et al. | 296/75 |
| 6,951,360 | B2 | * | 10/2005 | Nabert et al. | 296/75 |
| D570,764 | S | * | 6/2008 | Thomaz | D12/400 |
| 7,494,180 | B2 | * | 2/2009 | Rill | 296/209 |
| 2011/0241381 | A1 | * | 10/2011 | Sato et al. | 296/193.02 |
| 2011/0298246 | A1 | * | 12/2011 | Mildner | 296/193.07 |
| 2012/0256448 | A1 | * | 10/2012 | Yasui et al. | 296/209 |

FOREIGN PATENT DOCUMENTS

| | | |
|---|---|---|
| JP | 8-26139 A | 1/1996 |
| JP | 2002-211303 A | 7/2002 |
| JP | 2006-213176 A | 8/2006 |
| JP | 3997425 B2 | 10/2007 |
| JP | 4438416 B2 | 3/2010 |

OTHER PUBLICATIONS

Japanese Office Action dated Feb. 18, 2014, issued in Japanese Patent Application No. 2012-086461 (4 pages).

* cited by examiner

*Primary Examiner* — Pinel Romain
(74) *Attorney, Agent, or Firm* — Westerman, Hattori, Daniels & Adrian, LLP

(57) ABSTRACT

A front portion structure of a vehicle body includes: a dashboard lower panel extending in a vehicle width direction; an outrigger provided under the dashboard lower panel and extending outwards from the front side frame in the vehicle width direction; and a side sill extending from the outer portion of the outrigger in the vehicle width direction, toward the back of the vehicle; a footrest portion for a passenger, formed to the dashboard lower panel; and a reinforcing plate to reinforce the footrest portion, joined to the dashboard lower panel and covering the footrest portion from the passenger space side. A flange is formed to the reinforcing plate, and is joined to a side face of a side sill inner panel of the side sill.

11 Claims, 16 Drawing Sheets

FRONT PORTION STRUCTURE OF VEHICLE BODY

CROSS REFERENCES TO RELATED APPLICATIONS

The present application claims priority under 35 U.S.C. §119 to Japanese Patent Application No. 2012-086461, filed Apr. 5, 2012, entitled "Front Portion Structure of Vehicle Body." The contents of this application are incorporated herein by reference in their entirety.

TECHNICAL FIELD

An exemplary subject matter of the present disclosure relates to a structure for a front portion of a vehicle body, including a reinforcing plate which covers, from passenger space side of a vehicle, a footrest portion of a dashboard lower panel provided so as to partition the vehicle along the vehicle width direction, and also reinforces the footrest portion.

BACKGROUND

Heretofore, there has been proposed a structure for a front portion of a vehicle body, including a dashboard panel extending in the width direction of the vehicle at the front of the passenger space, front pillars which extend vertically at the sides of the front of the passenger space, side sills extending toward the back of the vehicle from the lower ends of the front pillars, a dashboard cross-member which is provided to the dashboard panel and extends in the width direction of the vehicle, and a gusset member which links the front pillars and the side sills to the dashboard cross-member.

According to this structure for a front portion of a vehicle body, the front pillars and side sills are linked with the gusset member, thus rigidity of the corners of the front of the floor can be improved (e.g., see Japanese Patent No. 4,438,416).

Also, there has been proposed a structure for a front portion of a vehicle body, including a dashboard panel provided so as to provide a partition between the engine room of a vehicle and the passenger space thereof, a bracket provided below the dashboard panel on the passenger space side, with space ensured between the bracket and the dashboard panel, a carpet provided on the passenger space side of the bracket, and a footrest main unit provided on the rear face of the carpet, such that the carpet and footrest main unit can be moved toward the passenger space side when a front collision load acts upon the dashboard panel.

According to this structure for a front portion of a vehicle body, the carpet and footrest main unit can be moved toward the passenger space side when a head-on collision occurs, whereby load on the ankles of passengers can be reduced (e.g., see Japanese Patent No. 3,997,425).

With the structure for a front portion of a vehicle body according to Japanese Patent No. 4,438,416, rigidity of the corners of the front of the floor can be improved, but a narrow-offset collision load cannot be effectively transmitted to the side sill inner panel when the collision load acts on an area from the front corner toward the inner side in the width direction of the vehicle to the footrest portion of the dashboard lower panel where the footrest is provided. Note that the term "narrow offset collision" generally refers to a collision where a frontal collision is greatly offset to the right or left such that the frontal collision load acts on the outer portion located outer than the front side frame in the vehicle width direction.

With the structure for a front portion of a vehicle body according to Japanese Patent No. 3,997,425, space is insured between the dashboard panel (dashboard lower panel) and footrest main unit (footrest), so that load on the ankles of passengers can be reduced in the case of a front-end collision, deformation of the dashboard panel is allowed until the dashboard panel comes into contact with the bracket, and thus deformation of the footrest portion of the dashboard lower panel where the footrest is situated is not reduced. That is to say, the strength of the footrest portion is not proactively improved.

SUMMARY

The present disclosure describes a structure for a front portion of a vehicle body where a narrow offset collision load acting on the footrest portion of the dashboard lower panel is transmitted to the side sill inner panel, and also deformation of the footrest portion of the dashboard lower panel is reduced.

The present disclosure also describes a structure for a front portion of a vehicle body where collapsing of the side sill inner panel is reduced.

According to an aspect of the present disclosure, a front portion structure of a vehicle body includes a dashboard lower panel extending in a vehicle width direction to partitioning the vehicle body; a front side frame extending in a longitudinal direction of the vehicle body to intersect the dashboard lower panel under the dashboard lower panel; an outrigger provided under the dashboard lower panel and extending outwards from the front side frame in the vehicle width direction; a side sill extending from an outer portion of the outrigger in the vehicle width direction, toward the back of the vehicle body, the side sill including a side sill inner panel; a floor frame formed on the inner side of the front side frame in the vehicle width direction, extending toward the back of the vehicle along the side sill; a footrest portion serving as a footrest for a passenger, formed as a part of the dashboard lower panel; and a reinforcing plate covering the footrest portion from a passenger space side thereof to reinforce the footrest portion, and joined to the dashboard lower panel. The reinforcing plate includes a flange joined to a side surface of the side sill inner panel of the side sill.

With this configuration, the structure for a front portion of a vehicle body includes: a dashboard lower panel, partitioning a vehicle along the vehicle width direction; a front side frame extending in the front-back direction of the vehicle from in front of the dashboard lower panel and passing beneath the dashboard lower panel; an outrigger provided beneath the dashboard lower panel and extending outwards from the front side frame in the width direction of the vehicle; a side sill extending from the outer sides of the outrigger in the width direction of the vehicle, toward the back of the vehicle, the side sill having a side sill inner panel; and a floor frame formed on the inner side of the front side frame in the width direction of the vehicle, extending toward the back of the vehicle along the side sill. A footrest portion serving as a footrest for a passenger, is formed to the dashboard lower panel.

While many vehicle collision experiments have focused on front-end collisions, it has been found that with actual collision accidents, the percentage of accidents where the force is greatly offset to one side or the other is greater than front-end collisions. With such offset collisions, frontal collision load acts on the outer side of the front side frames in the direction of the width of the vehicle. Such collisions are called narrow-offset collisions. The shock of a front-end collision is absorbed with the overall front of the vehicle, but with a narrow-offset collision, the collision load does not act on the front side frames, thus energy is not absorbed by the front side frames and vehicular damage is more serious. Accordingly, it is preferable to design vehicle strength and shock absorption characteristics assuming narrow-offset collisions.

Accordingly, a reinforcing plate to reinforce the footrest portion is jointed to the dashboard lower panel and covering the footrest portion from the passenger space side, with a flange jointed to a side face of the side sill inner panel of the side sill being formed to the reinforcing plate, thus a narrow-offset collision load acting on the footrest portion of the dashboard lower panel can be transmitted to the side sill inner panel. Consequently, deformation of the footrest portion of the dashboard lower panel can be reduced.

The flange may have bead shapes extending vertically near a joint portion between the side sill inner panel and dashboard lower panel.

With this configuration, the flange has bead shapes extended vertically near the joint portion between the side sill inner panel and dashboard lower panel, thus the area around the joint can be reinforced and strengthened. Accordingly, collapsing of the side sill inner panel can be reduced.

The reinforcing plate may have multiple recess-shaped portions formed by indenting the reinforcing plate toward the dashboard lower panel, with the recess-shaped portions being jointed by welding to the dashboard lower panel.

With this configuration, the reinforcing plate has multiple recess-shaped portions formed by indenting the reinforcing plate toward the dashboard lower panel, and the recess-shaped portions are jointed by welding to the dashboard lower panel, whereby a closed cross-section is formed between the reinforcing plate and the dashboard lower panel, and further, the strength of the footrest portion can be increased. Consequently, the amount of narrow-offset collision load absorbed can be increased, and also deformation of the dashboard lower panel can be reduced.

The reinforcing plate may be jointed with the floor frame.

With this configuration, the reinforcing plate is jointed with the floor frame, so strength and rigidity around the foot rest portion of the dashboard lower panel can be improved even further.

The reinforcing plate may be jointed with the outrigger.

With this configuration, the reinforcing plate is jointed with the outrigger, thus the load of a narrow-offset collision is first transmitted to the side sill inner panel, and next transmitted to the dashboard lower panel by way of the outrigger and reinforcing plate. Accordingly, load absorption due to deformation of the side sill inner panel can be expected, thus the load acting on the dashboard lower panel can be reduced.

The dashboard lower panel may have right and left wheel houses provided to the front thereof, with wheel house portions each forming the rear portions of the right and left wheel houses being formed in the dashboard lower panel, and the reinforcing plate extending to the wheel house portions.

With this configuration, the dashboard lower panel has right and left wheel houses provided to the front thereof, and wheel house portions each forming the rear portions of the right and left wheel houses are formed in the dashboard lower panel. For example, strength and rigidity is increased by the wheel house portions being formed by curving the dashboard lower panel so as to protrude toward the passenger space side thereof. Accordingly, extending the reinforcing plate to the wheel house portion enables supporting strength and rigidity of the footrest portion to be increased with the reinforcing plate. Consequently, capabilities of protecting the legs of the passenger can be improved.

The dashboard lower panel may have a dashboard lower carpet which covers the dashboard lower panel from the passenger space side thereof, the dashboard lower carpet having a footrest integrally formed thereto, protruding toward the passenger space, and the footrest having a recessed space (cavity) formed at the dashboard lower panel side, with the reinforcing plate being disposed at the recessed space of the footrest.

With this configuration, the dashboard lower panel has a dashboard lower carpet which covers the dashboard lower panel from the passenger space side. The dashboard lower carpet has a footrest integrally formed thereto, protruding toward the passenger space, and the footrest has a recessed space formed at the dashboard lower panel side. The reinforcing plate is disposed at the recessed space of the footrest, thus the strength and rigidity of the recessed space toward the front of the vehicle is ensured. Accordingly, there is no need to reinforce the footrest, thus the shock absorbing functions of the footrest can be freely improved. That is to say, the degree of freedom in design can be broadened.

BRIEF DESCRIPTION OF THE DRAWINGS

The advantages of the disclosure will become apparent in the following description taken in conjunction with the following drawings.

DETAILED DESCRIPTION

Figure 1:
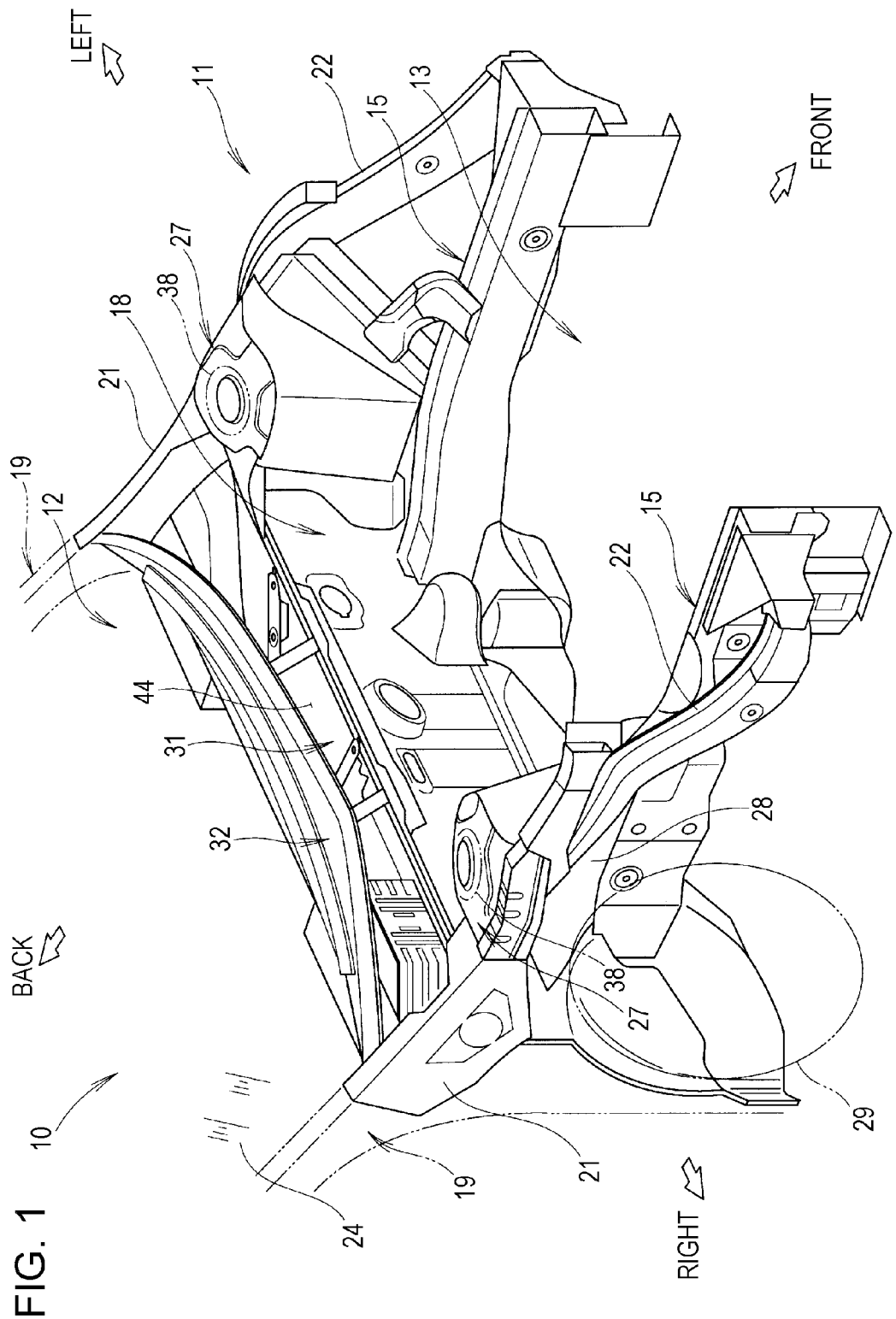
FIG. 1 is a perspective view illustrating a structure for a front portion of a vehicle body, according to a first embodiment of the present disclosure.

Embodiments of the present disclosure will be described with reference to the attached drawings. In the drawings, front, back, right and left arrows indicate the directions viewed from a passenger of the vehicle.

First Embodiment

A structure for a front portion of a vehicle body according to the present disclosure involves flanged connection of a footrest portion 144 of a dashboard lower panel 18 to a side face 141b of a side sill inner panel 141, with a reinforcing plate 146 being disposed so as to cover the footrest portion 144, thereby reducing deformation of the dashboard lower panel 18 to which the footrest portion 144 is provided and a floor panel 17, caused by the load of the narrow-offset collision.

As illustrated in FIGS. 1 through 13, a vehicle 10 has, at the front portion of a vehicle body 11, right and left front side frames 15 extending in the front-back direction of the vehicle, the dashboard lower panel 18 partitioning the vehicle body 11 along the vehicle width direction in the front-back direction, right and left front pillars 19 provided to the sides of the dashboard lower panel 18, right and left upper members (apron reinforcements) 21 extending in the front-back direction of vehicle from the right and left front pillars 19, right and left lower members 22 extended from the right and left upper members 21 diagonally downward toward the front of the vehicle, a dashboard upper panel 31 provided above the dashboard lower panel 18, a windshield lower support 32 provided above the dashboard upper panel 31, a windshield (windshield glass) 24 the lower edge of which is supported by the windshield lower support 32, right and left damper housings 27 supporting damper units 38, and right and left wheel houses 28 provided below the damper housings 27 to cover wheels 29.

Further, the vehicle 10 includes an outrigger 26 extending outwards from the front side frame 15 in the width direction of the vehicle, side sills 16 extending toward the back of the vehicle from the outer sides of the outrigger 26 in the width direction of the vehicle, the front side frames 15 extending in the front-back direction of the vehicle from the position on the front side of the dashboard lower panel 18, and the floor panel 17 extending toward the back of the vehicle from the dashboard lower panel 18.

The right and left damper housings 27 are provided to the front of the dashboard lower panel 18. The right and left wheel houses 28 are provided on an engine room 13 side of the dashboard lower panels 18. Note that the vehicle 10 has the steering wheel on the left side.

The dashboard lower panel 18 is a member which provides a partition between the engine room 13 and a passenger space 12. The dashboard lower panel 18 has right and left ends thereof in the direction of the width of the vehicle, connected (jointed) with the right and left front pillars 19, respectively. The dashboard lower panel 18 has right and left wheel houses 28 provided to the front thereof, with wheel house portions 101 each forming the respective rear portions of the right and left wheel houses 28 being formed in the dashboard lower panel 18.

The dashboard lower panel 18 has a dashboard cross-member 35 extending in the direction of the width of the vehicle on the passenger space 12 side, and a brake master cylinder reinforcing plate (brake master cylinder attachment portion) 37 to which a brake master cylinder 36 is attached. Also, an accelerator pedal bracket 103 supporting an accelerator pedal (not shown), a steering shaft joint cover 105 through which a steering shaft 104 passes, and a reinforcing plate 146 covering the footrest portion 144 (see FIG. 8) are provided to one side of the vehicle body 11 (left side).

Figure 3:
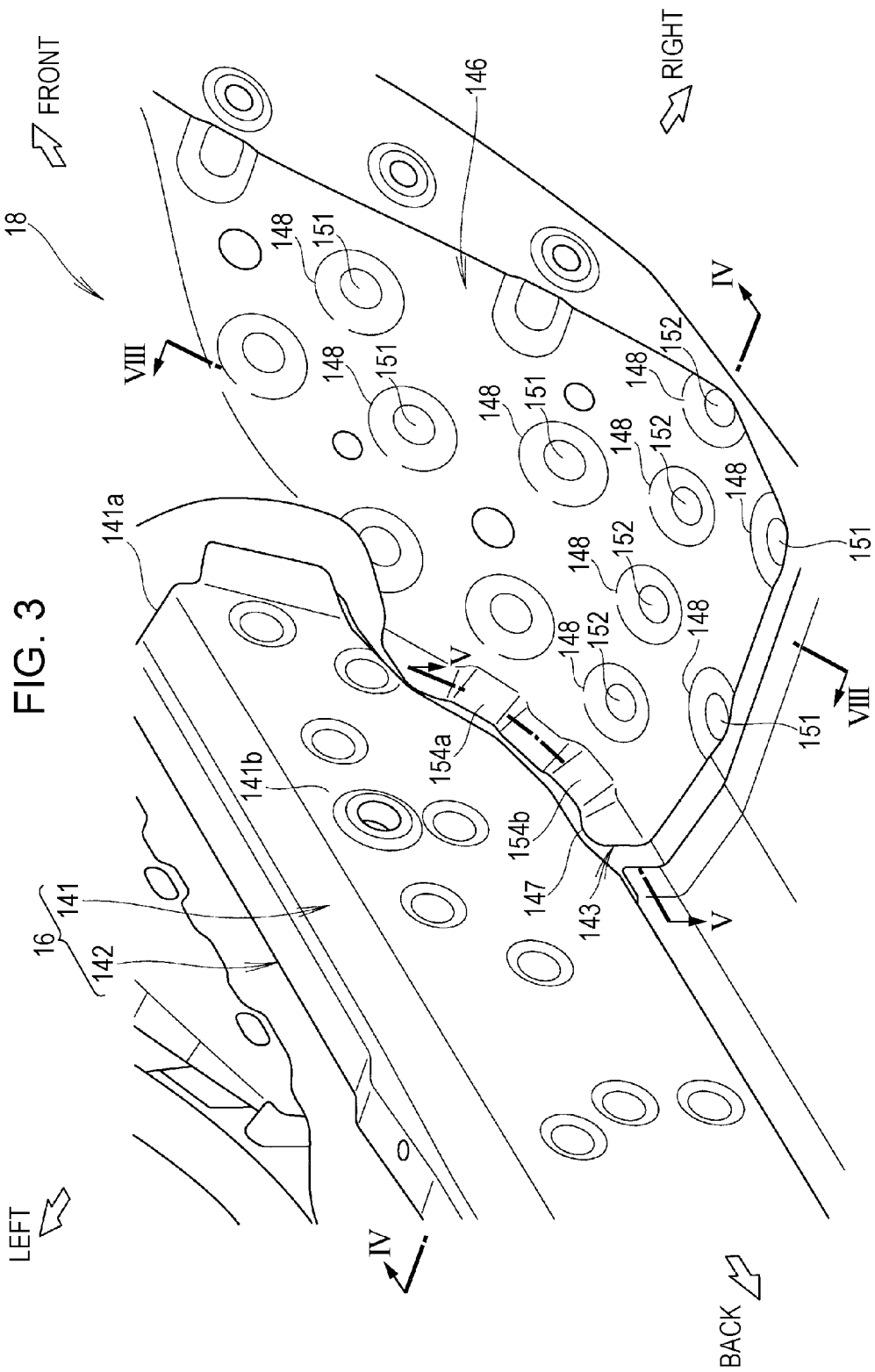
FIG. 3 is an enlarged view of a portion III in FIG. 2.
Figure 5:
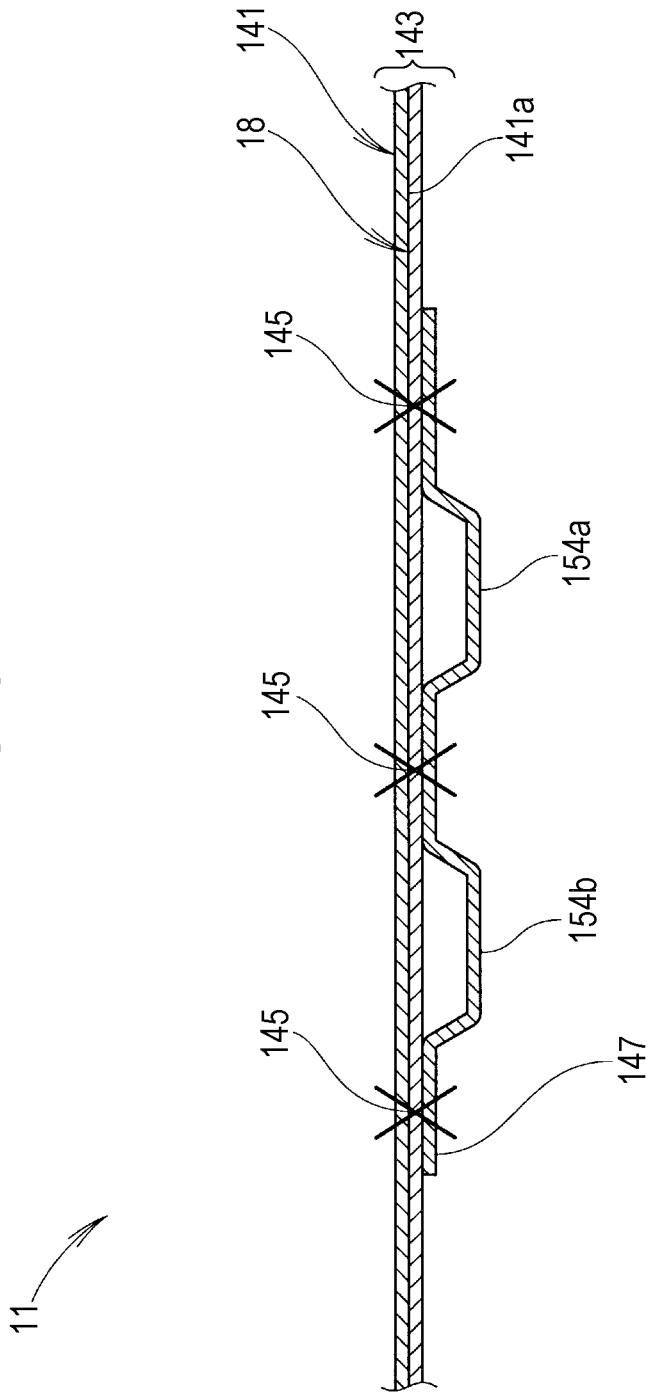
FIG. 5 is a cross-sectional view taken along V-V in FIG. 3.
Figure 8:
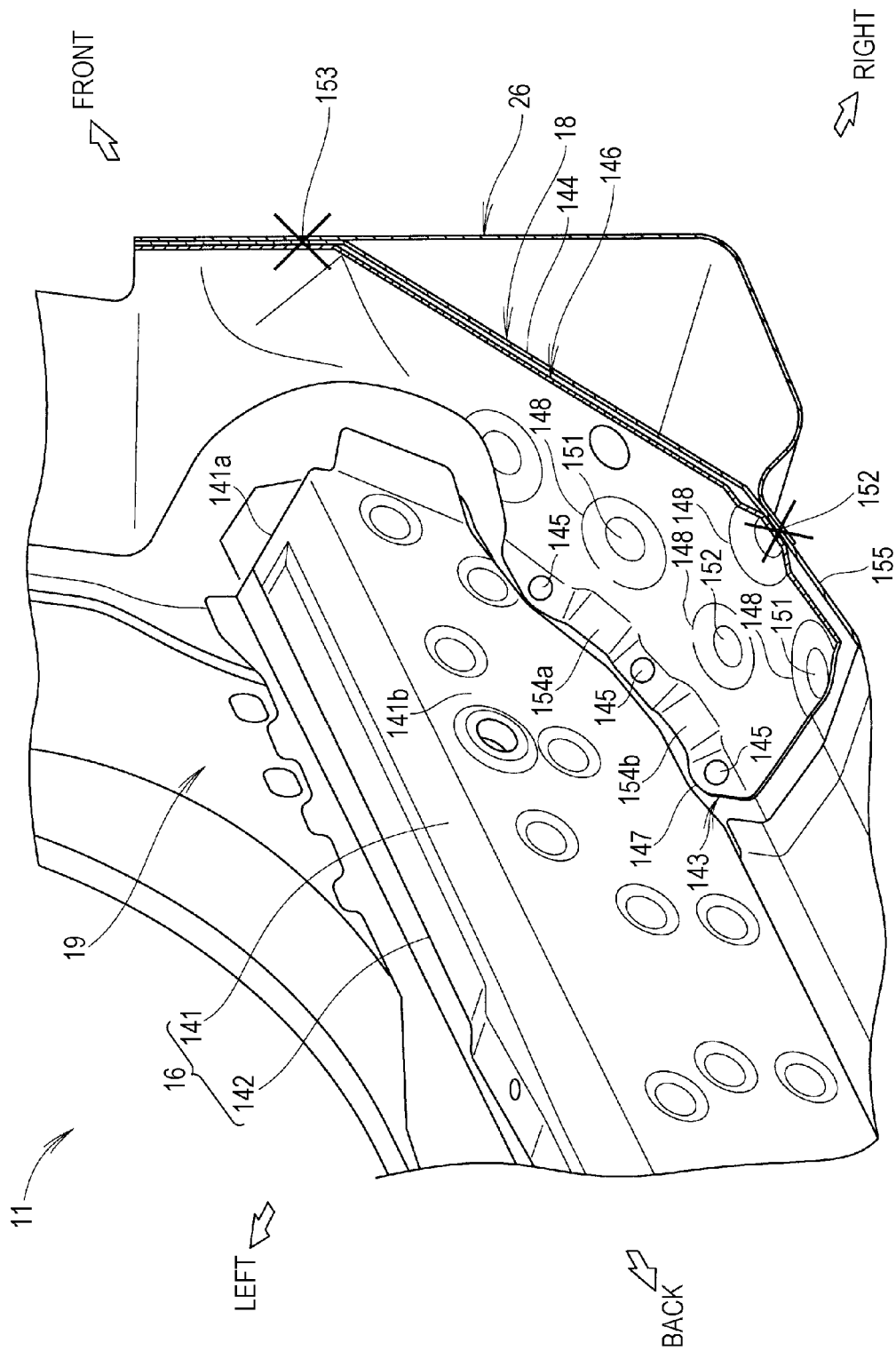
FIG. 8 is a cross-sectional view taken along VIII-VIII in FIG. 3.

As illustrated in FIGS. 3 and 5, the dashboard lower panel 18 has joint portion 143 formed with the side faces 141b of the side sill inner panel 141. Also, as illustrated in FIG. 8, the dashboard lower panel 18 has the footrest portion 144 provided, which is a footrest portion for the passenger. Moreover, the dashboard lower panel 18 has a dashboard lower carpet 156 which covers the dashboard lower panel 18 from the passenger space 12 side thereof (see FIG. 12).

Figure 2:
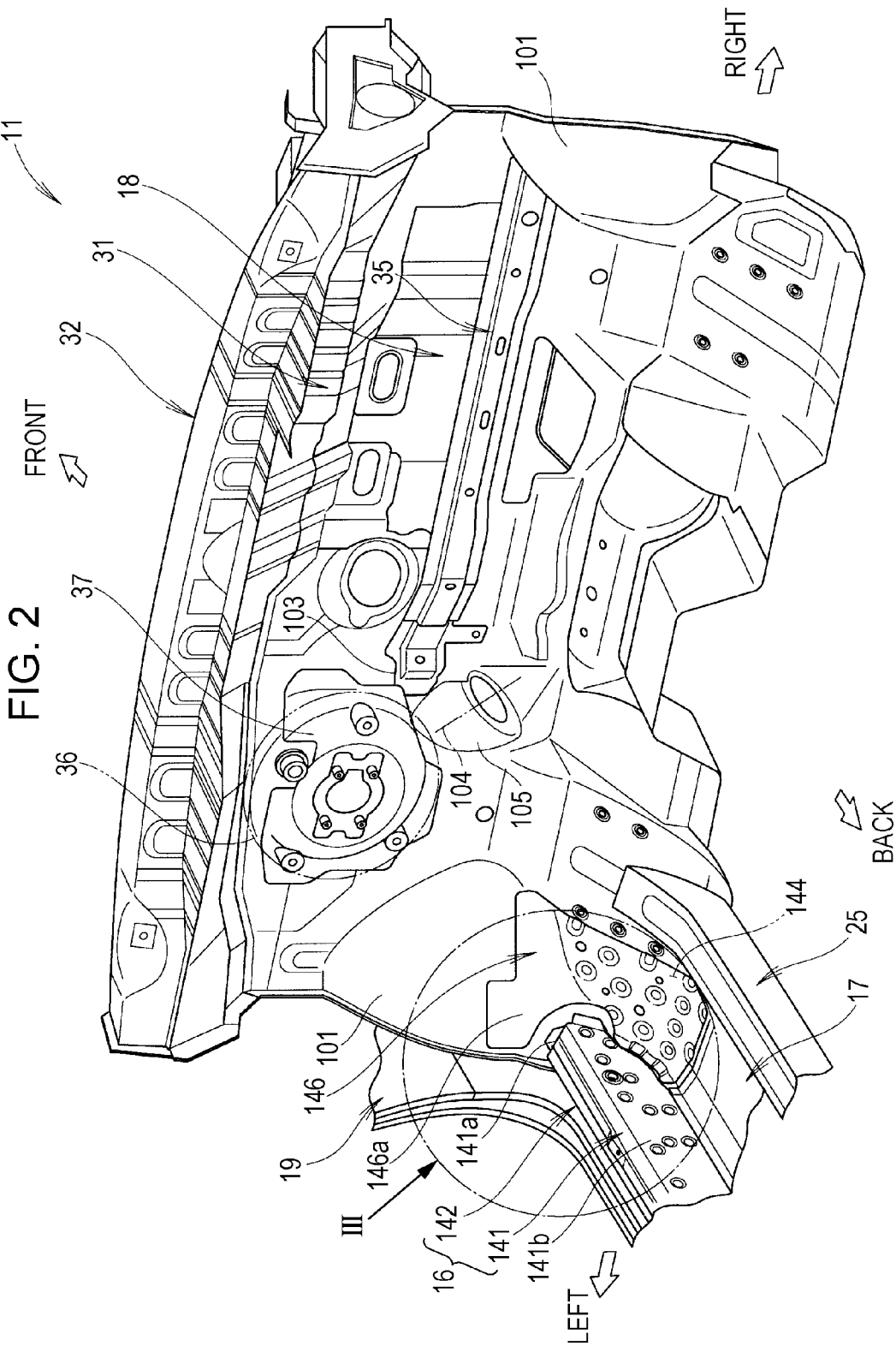
FIG. 2 is a perspective view of the structure for a front portion of a vehicle body, viewed from the inside passenger space of the vehicle illustrated in FIG. 1.

As illustrated in FIG. 2, the side sills 16 extend from the outer side of the outrigger 26 in the width direction of the vehicle toward the back of the vehicle. The side sill 16 includes the side sill inner panel 141 formed on the inner passenger space side of the side sill, and a side sill outer panel 142 formed on the outer side thereof.

The front side frame 15 extends in the front-back direction of the vehicle, from the position in front of the dashboard lower panel 18 through a lower portion 155 of the dashboard lower panel 18.

Figure 4:
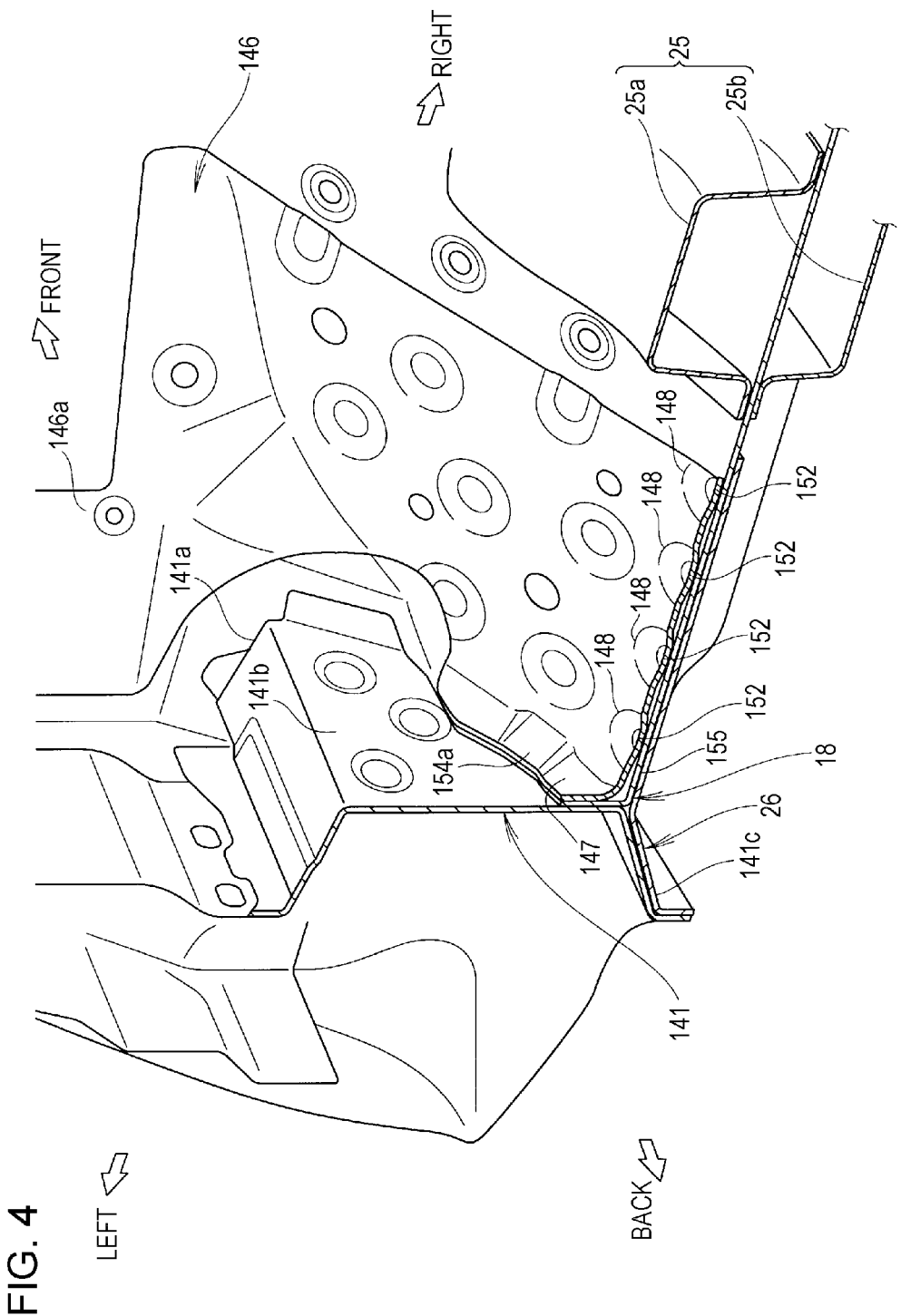
FIG. 4 is a cross-sectional view taken along IV-IV in FIG. 3.
Figure 9:
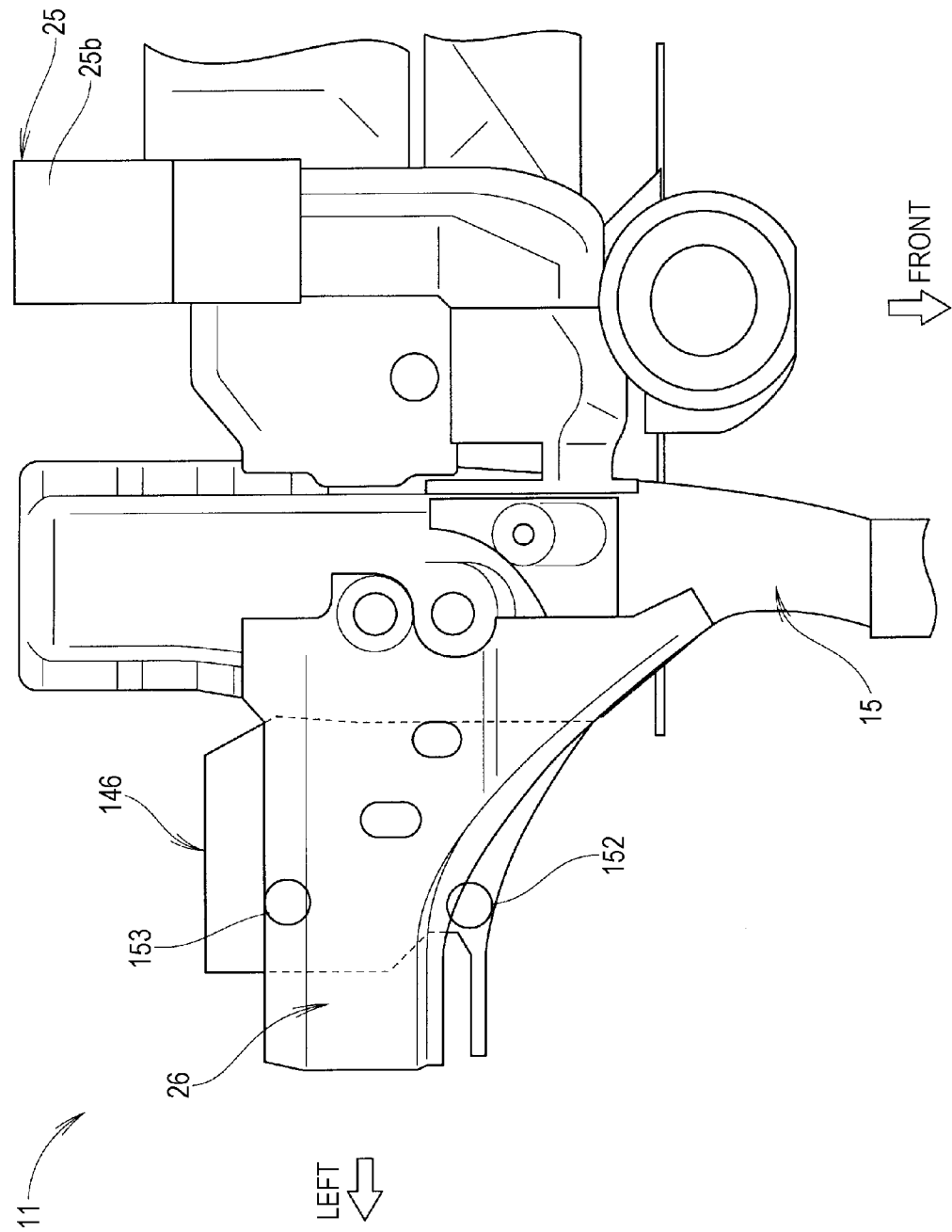
FIG. 9 is a transparent view through a dashboard lower panel of the structure for a front portion of a vehicle body illustrated in FIG. 1, viewed from the bottom face of the vehicle.

As illustrated in FIGS. 2, 4 and 9, a floor frame 25 is formed on the inner side of the front side frames 15 in the width direction of the vehicle, extending toward the back of the vehicle along the side sills 16. The floor frame 25 includes an upper frame 25a formed at the passenger space 12 side of the floor panel 17, and a lower frame 25b formed below the floor panel 17.

Figure 6:
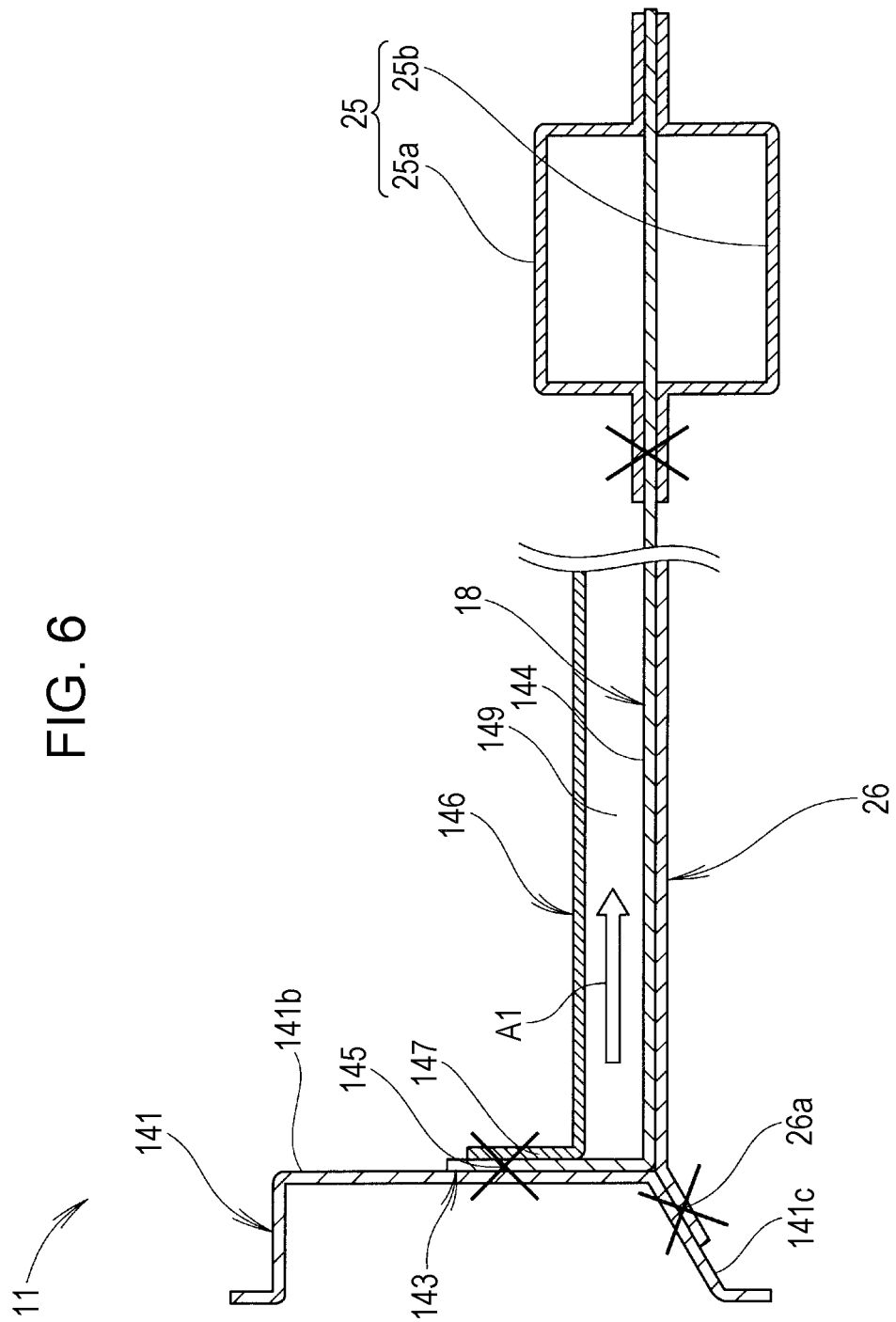
FIG. 6 is a conceptual diagram of a general face of a reinforcing plate of the structure for a front portion of a vehicle body illustrated in FIG. 3.

The outrigger 26 extends outwards in the width direction of the vehicle from the front side frame 15 at the lower portion 155 of the dashboard lower panel 18, as illustrated in FIGS. 6 and 9. The outrigger 26 is jointed to a lower face 141c of the side sill inner panels 141 at a joint portion 26a (see FIG. 6).

As illustrated in FIG. 2, the wheel house portions 101 are formed by curving the dashboard lower panel 18 so as to protrude toward the passenger space 12 side, thereby increasing the rigidity thereof. The wheel house portions 101 are portions where the back portions of the wheel houses 28 are each formed.

As illustrated in FIG. 8, the footrest portion 144 has the reinforcing plate 146 provided thereto, which is jointed to the dashboard lower panel 18 so as to cover the footrest portion 144 from the passenger space 12 side, and also reinforce the footrest portion 144. That is to say, the footrest portion 144 is covered by the reinforcing plate 146.

As illustrated in FIGS. 3 through 9, a flange 147 to be jointed to the side face 141b of the side sill inner panel 141 is formed to the reinforcing plate 146. More particularly, the flange 147 is spot welded, at spot weld points 145, to a joint portion 143 of the side face 141b of the side sill inner panel 141 and the dashboard lower panel 18, interposing the dashboard lower panel 18.

The reinforcing plate 146 has multiple recessed dimple-shaped portions 148 formed by indenting the reinforcing plate 146 toward the dashboard lower panel 18. The dimple-shaped portions 148 are jointed (by welding) to the outrigger 26 at a joint portion 152 interposing the dashboard lower panel 18 (footrest portion 144). The dimple-shaped portions 148 are jointed (by welding) to the dashboard lower panel 18 alone at a joint portion 151. The reinforcing plate 146 is also jointed (by welding) to the outrigger 26 at a joint portion 153, interposing the footrest portion 144.

By jointing the reinforcing plate 146 with the outrigger 26, the load at the time of a narrow-offset collision is first transmitted to the side sill inner panels 141, deforming the side sill inner panels 141, and then the load is transmitted to the dashboard lower panel 18 by way of the outrigger 26 and reinforcing plate 146. Thus, deformation of the floor panel 17 is reduced.

By forming dimple-shaped portions 148 in the reinforcing plate 146 toward the dashboard lower panel 18, and jointing the dimple-shaped portions 148 to the dashboard lower panel 18 by welding, a closed cross-section 149 is formed between the reinforcing plate 146 and the dashboard lower panel 18, increasing strength, so as to absorb load at the time of a narrow-offset collision, and also reduce deformation of the dashboard lower panel 18.

The flange 147 which is jointed at or near the joint portion 143 between the side sill inner panel 141 and dashboard lower panel 18, and an extended portion 146*a* of the reinforcing plate 146 which extends to the wheel house portion 101, are formed to the reinforcing plate 146. The wheel house portion 101 is a portion formed with increased strength and rigidity due to being curved so as to protrude toward the passenger space 12 side, thus the strength and rigidity of the footrest portion 144 is further improved. That is to say, the reinforcing plate 146 is extended to the wheel house portion 101 of the dashboard lower panel 18 so as to protect the legs of the passengers.

As illustrated in FIGS. 3 and 5, the flange 147 has bead shapes 154*a* and 154*b* extended vertically at or near the joint portion 143 between the side sill inner panel 141 and dashboard lower panel 18. The flange 147 is jointed by spot weld points 145. That is, the reinforcing plate 146 is flange-connected to the side face 141*b* of the side sill inner panel 141.

FIG. 6 illustrates a cross-sectional view of a general face of the reinforcing plate 146 where dimple-shaped portions 148 are not formed, with the closed cross-section 149 being formed between the dashboard lower panel 18 and the reinforcing plate 146. For example, in the event that a narrow-offset collision occurs, the load of the narrow-offset collision is transmitted from the outside of the reinforcing plate 149 toward the inside thereof in the width direction of the vehicle via the closed cross-section 149, as indicated by the arrow A1. Thus, the load of a narrow-offset collision is dispersed.

Figure 7:
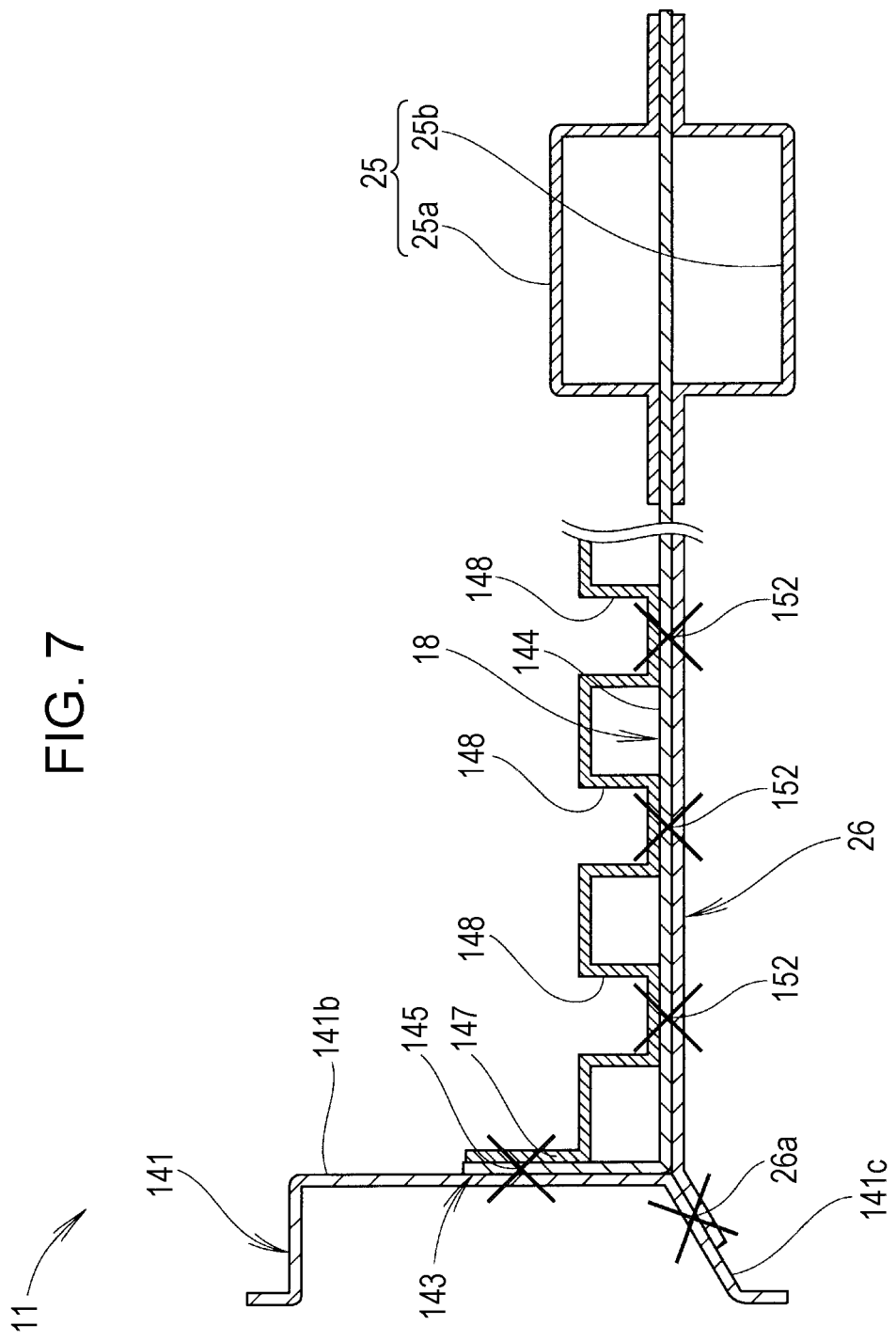
FIG. 7 is a conceptual diagram of a joint portion of the reinforcing plate of the structure for a front portion of a vehicle body illustrated in FIG. 3.

FIG. 7 illustrates a cross-sectional view of a reinforcing plate jointed portion of the reinforcing plate 146 where dimple-shaped portions 148 are formed, with the dimple-shaped portions 148 being jointed by welding to the outrigger 26 at the joint portion 152 interposing the dashboard lower panel 18 (footrest portion 144). Accordingly, the footrest portion 144 is integrally jointed with the reinforcing plate 146 and the outrigger 26, thereby improving strength and rigidity.

Figure 10A:
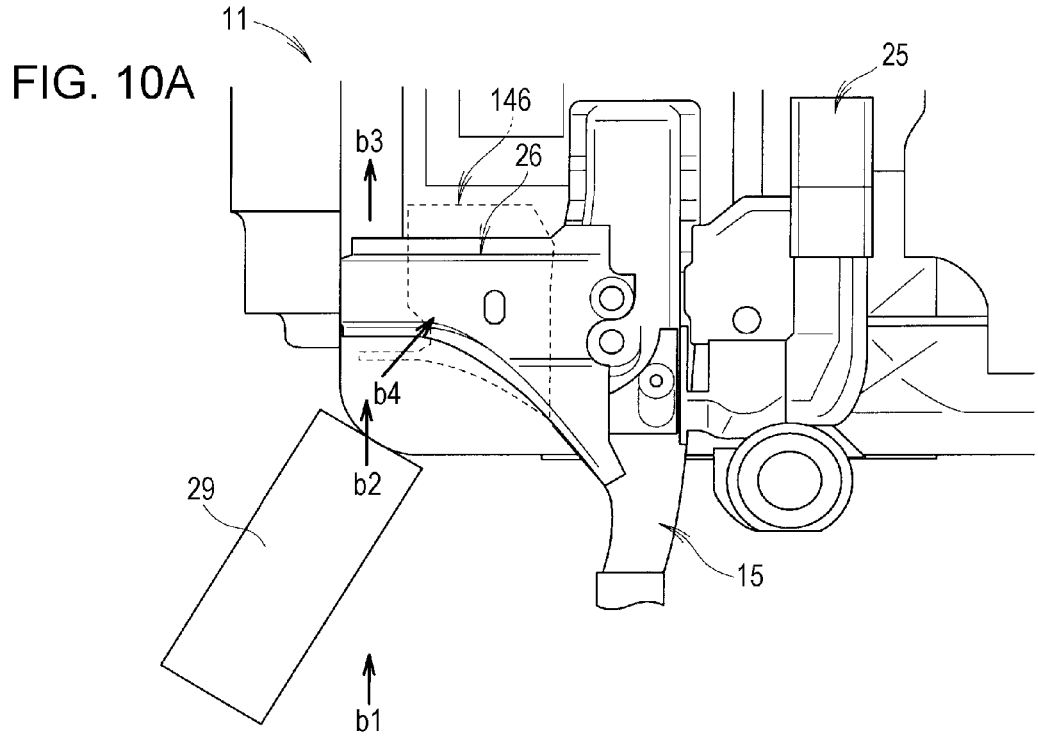
FIGS. 10A and 10B are explanatory diagrams illustrating the way in which load is transmitted in the structure for a front portion of a vehicle body illustrated in FIG. 1, when a narrow-offset collision occurs.
Figure 10B:
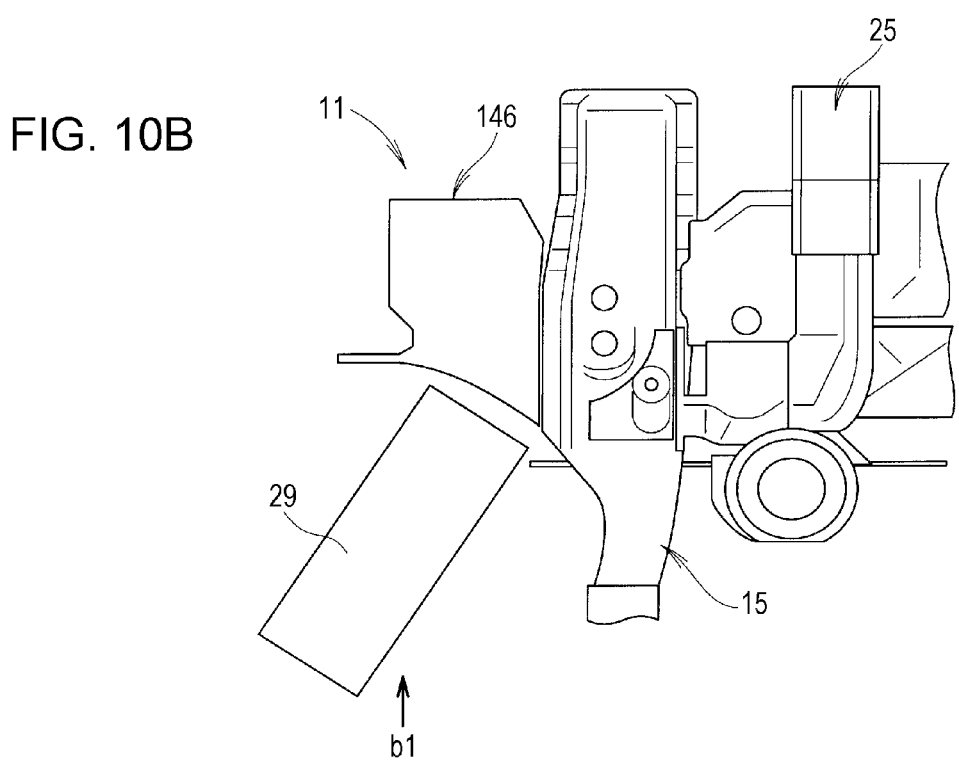

FIG. 10A is a bottom view from below the vehicle body, and FIG. 10B is a bottom view with the dashboard lower panel 18 and outrigger 26 removed. In the event of a collision with a pole, for example, at the outer side of the front side frame 15 in the width direction of the vehicle, which is a narrow-offset collision, as indicated by the arrow b1, the wheel (tire) 29 rotates as it comes into contact with a tip 141*a* (see FIG. 3) of the side sill inner panel 141 as indicated by the arrow b2. The load thereof is transmitted to the side sill inner panel 141 as indicated by the arrow b3, and the load is also transmitted to the footrest portion 144 of the dashboard lower panel 18 (see FIG. 8) and outrigger 26 as indicated by the arrow b4.

Accordingly, the tip 141*a* of the side sill inner panel 141 is forced to collapse toward the footrest portion 144. With the structure for a front portion of a vehicle body according to the present disclosure, the strong reinforcing plate 146 is jointed to the joint portion 143 of the side sill inner panel 141 and dashboard lower panel 18 (see FIG. 3), and thus suppresses deformation of the floor panel 17.

The flange 147 has bead shapes 154*a* and 154*b* formed in the vertical direction at or near the joint portion 143 of the side sill inner panel 141 and dashboard lower panel 18, and thus the joint portion 143 is reinforced and strengthened, which reduces collapsing of the side sill inner panel 141. That is to say, by flange-connection of the side face 141*b* of the side sill inner panel 141 to the footrest portion 144 of the dashboard lower panel 18, and disposing the reinforcing plate 146 covering the footrest portion 144, deformation of the footrest portion 144 of the dashboard lower panel 18 due to transmission of the load of a narrow-offset collision to the side sill inner panel 141 can be reduced.

Also, the reinforcing plate 146 has dimple-shaped portions 148 formed toward the dashboard lower panel 18, which are joined by welding such that the closed cross-section 149 is formed between the reinforcing plate 146 and the dashboard lower panel 18, thus the strength of the reinforcing plate 146 can be improved and the load of a narrow-offset collision can be absorbed, and also deformation of the dashboard lower panel 18 can be reduced.

While many vehicle collision experiments have focused on front-end collisions, it has been found that with actual collision accidents, the percentage of accidents where the force is greatly offset to one side or the other is greater than front-end collisions. With such offset collisions, frontal collision load acts on the outer side of the front side frames in the direction of the width of the vehicle. Such collisions are called narrow-offset collisions. The shock of a front-end collision is absorbed with the overall front of the vehicle, but with a narrow-offset collision the collision load does not act on the front side frames, thus energy is not absorbed by the front side frames and vehicular damage is more serious. Accordingly, it is preferable to design vehicle strength and shock absorption assuming narrow-offset collisions.

Figure 11:
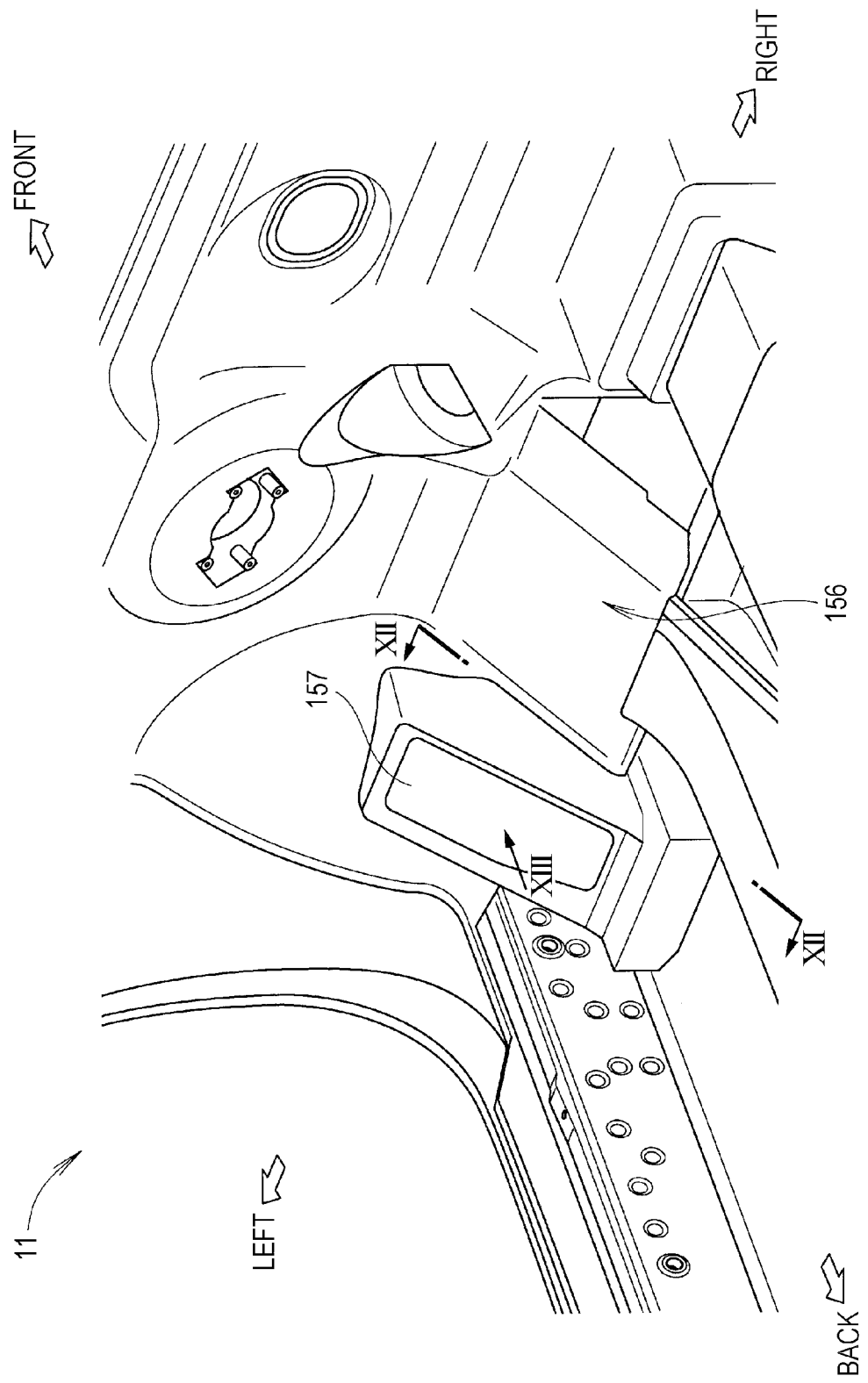
FIG. 11 is a perspective view illustrating the lower left portion of the passenger space with a dashboard insulator (dashboard lower cover) having been provided to the structure for a front portion of a vehicle body illustrated in FIG. 1.
Figure 12:
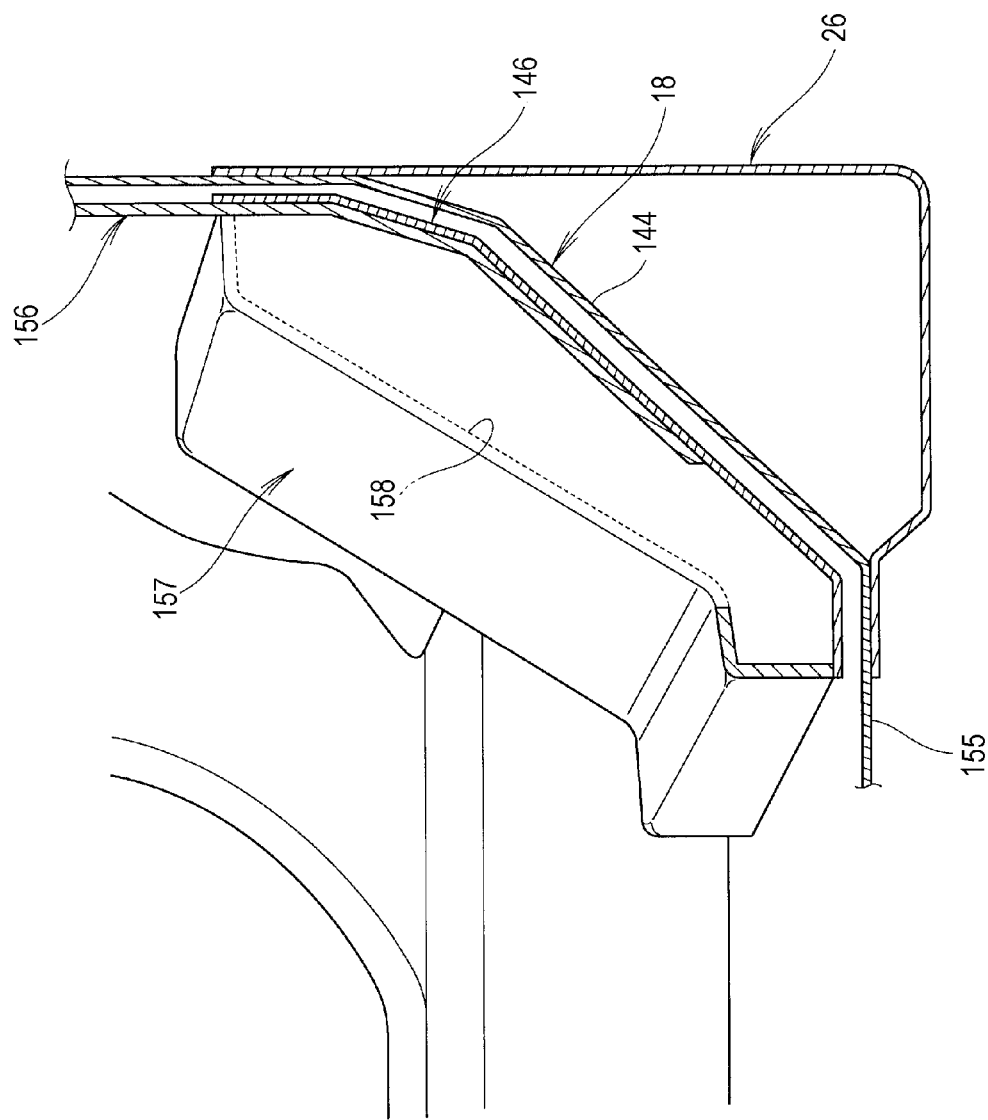
FIG. 12 is a cross-sectional view taken along XII-XII in FIG. 11.
Figure 13:
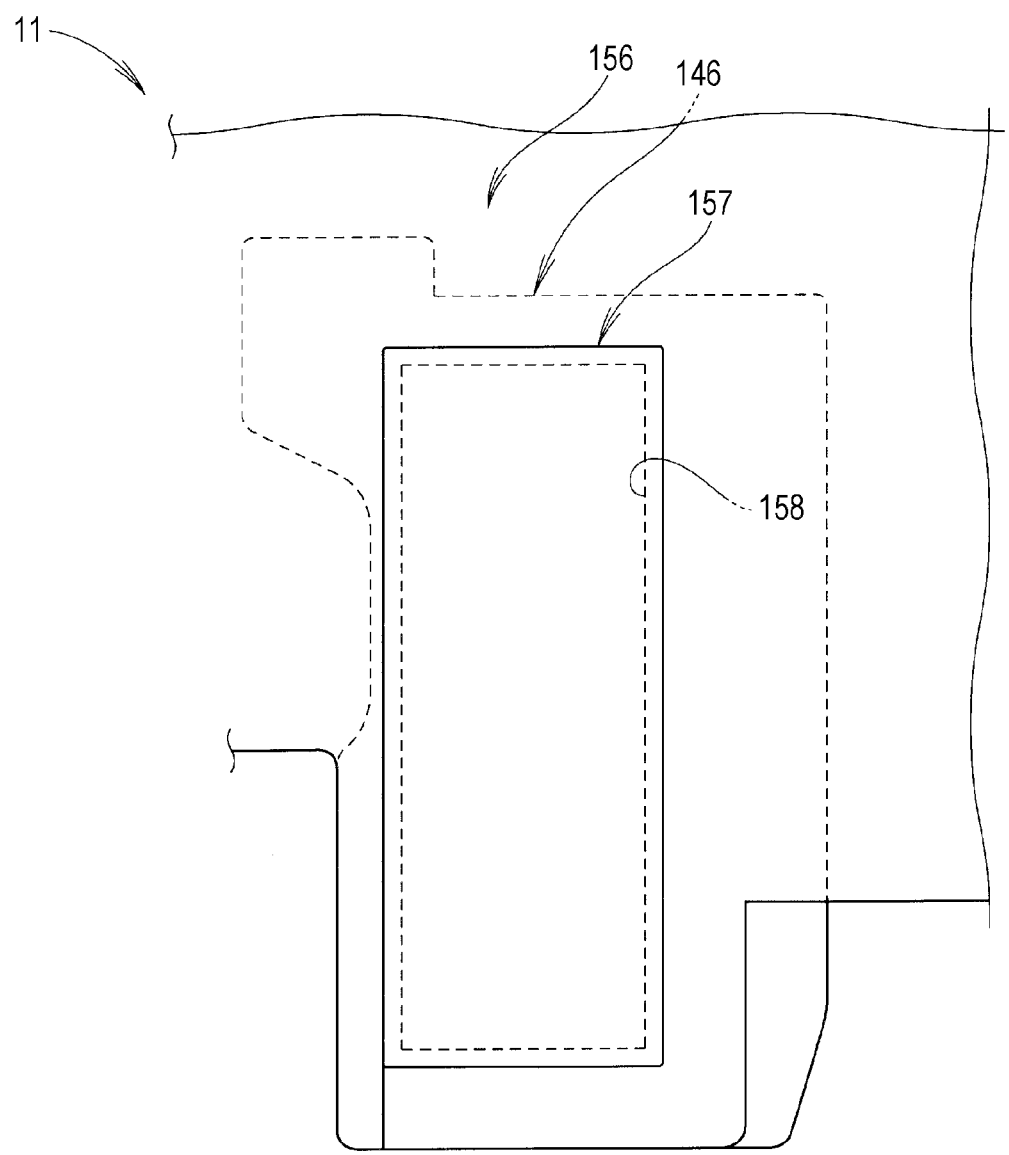
FIG. 13 is a view taken in the direction of the arrow XIII in FIG. 11.

As illustrated in FIGS. 11 through 13, a dashboard lower carpet 156 has a footrest 157 integrally formed with the dashboard lower carpet 156 and protruding toward the passenger space 12.

The footrest 157 has a recessed space (recess) 158 formed at the dashboard lower panel 18 side thereof, by forming a protrusion toward the passenger space 12. The reinforcing plate 146 is disposed at or near the recessed space (recess) 158 of the footrest 157.

In other words, this arrangement can be understood as a recessed space (recess) 158 being formed in the footrest 157 integrally formed with the dashboard lower carpet (dashboard insulation) 156, and the reinforcing plate 146 disposed corresponding to the formed recessed space 158. Accordingly, there is no need to reinforce the footrest 157 itself.

As illustrated in FIGS. 1 through 10B, the structure for a front portion of a vehicle body includes a dashboard lower panel 18 partitioning the vehicle body 11 in the front and back directions, front side frames 15 extending in the front-back direction of the vehicle, from the front of the dashboard lower panel 18 past a lower portion 155 of the dashboard lower panel 18, an outrigger 26 at the lower portion 155 of the dashboard lower panel 18, extending outwards in the width direction of the vehicle from the front side frame 15, side sills 16 extending from the outer side of the outrigger 26 toward the back of the vehicle, and a floor frame 25 is formed on the inner side of the front side frames 15 in the width direction of the vehicle, extending toward the back of the vehicle along the side sills 16. A footrest portion 144 is formed to the dashboard lower panel 18 to serve as a footrest for the passenger.

A reinforcing plate 146 which is jointed to the dashboard lower panel 18 and covers the footrest portion 144 from the passenger space 12 side, and also reinforces the footrest portion 144, is provided to the footrest portion 144, with a flange 147 being formed to the reinforcing plate 146 which is jointed to the side face 141b of the side sill inner panel 141 of the side sill 16. Accordingly, a narrow-offset collision load acting on the footrest portion 144 of the dashboard lower panel 18 can be transmitted to the side sill inner panel 141. Consequently, deformation of the footrest portion 144 of the dashboard lower panel 18 can be reduced.

As illustrated in FIG. 3, with the structure for a front portion of a vehicle body, the flange 147 has bead shapes 154a and 154b formed extending in the vertical direction at or near the joint portion 143 of the side sill inner panel 141 and dashboard lower panel 18, and thus the area around the joint portion 143 is reinforced and strengthened, which reduces collapsing of the side sill inner panel 141.

As illustrated in FIGS. 7 and 8, with the structure for a front portion of a vehicle body, multiple dimple-shaped portions 148 are formed in the reinforcing plate 146 toward the dashboard lower panel 18, and the dimple-shaped portions 148 are jointed to the dashboard lower panel 18 by welding, whereby a closed cross-section 149 is formed between the reinforcing plate 146 and the dashboard lower panel 18, and further, the strength of the footrest portion 144 is increased. Consequently, the absorbed amount of narrow-offset collision load is increased, and also deformation of the dashboard lower panel 18 is reduced.

As illustrated in FIGS. 8 and 9, with the structure for a front portion of a vehicle body, the reinforcing plate 146 is jointed to the outrigger 26, thus the load of a narrow-offset collision is first transmitted to the side sill inner panels 141, and next transmitted to the dashboard lower panel 18 by way of the outrigger 26 and reinforcing plate 146. Accordingly, load absorption due to deformation of the side sill inner panels 141 can be expected, thus the load acting on the dashboard lower panel 18 can be reduced.

As illustrated in FIGS. 2 and 4, with the structure for a front portion of a vehicle body, wheel houses 28 are provided to the right and left of and in the front of the dashboard lower panel 18, and wheel house portions 101 forming the back portion of the wheel houses 28 are formed to the dashboard lower panel 18. For example, strength and rigidity is increased by the wheel house portions 101 being formed by curving the dashboard lower panel 18 so as to protrude toward the passenger space 12 side. Accordingly, extending the reinforcing plate 146 to the wheel house portion 101 enables supporting strength and rigidity of the footrest portion 144 to be increased with the reinforcing plate 146. Consequently, capabilities of protecting the legs of the passenger can be improved.

As illustrated in FIGS. 11 through 13, with the structure for a front portion of a vehicle body, a dashboard lower carpet 156 is provided to the dashboard lower panel 18, covering the dashboard lower panel 18 from the passenger space 12 side. A footrest 157 protruding toward the passenger space 12 is formed integrally with the dashboard lower carpet 156, and a recessed space (recess) 158 is formed to the dashboard lower panel 18 side of the footrest 157.

Due to the reinforcing plate 146 being disposed corresponding to the recessed space 158 of the footrest 157, the strength and rigidity of the vehicle front portion located in front of the recessed space 158 is ensured. Accordingly, there is no need to reinforce the footrest 157, thus the shock absorbing functions of the footrest 157 can be freely improved, using an elastic material (shock-absorbing material) such as, for example, an elastomer like natural rubber, synthetic rubber, or the like. Thus, the degree of freedom in design can be improved.

Second Embodiment

Figure 14:
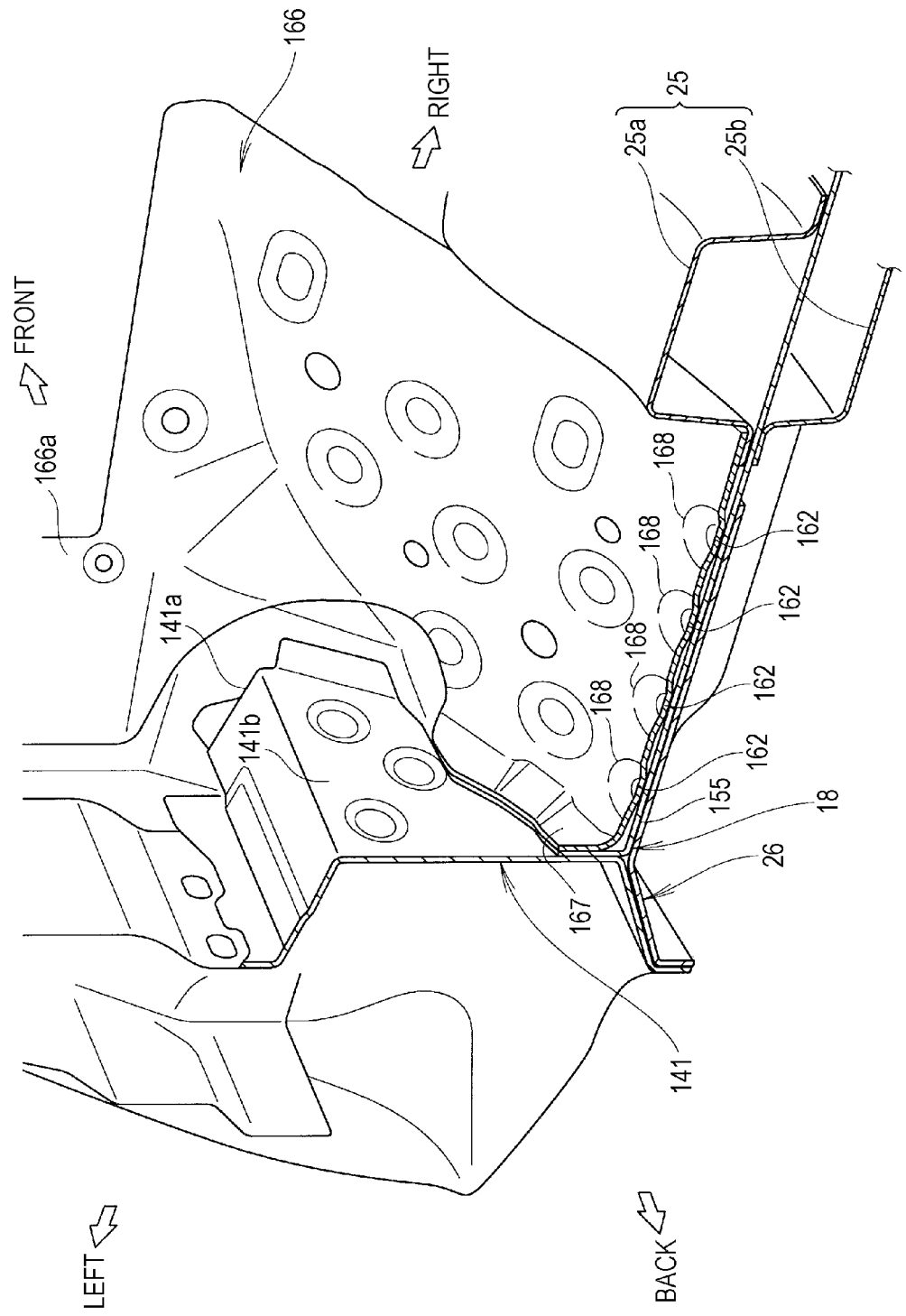
FIG. 14 is a perspective view illustrating a structure for a front portion of a vehicle body, according to a second embodiment of the present disclosure.
Figure 15:
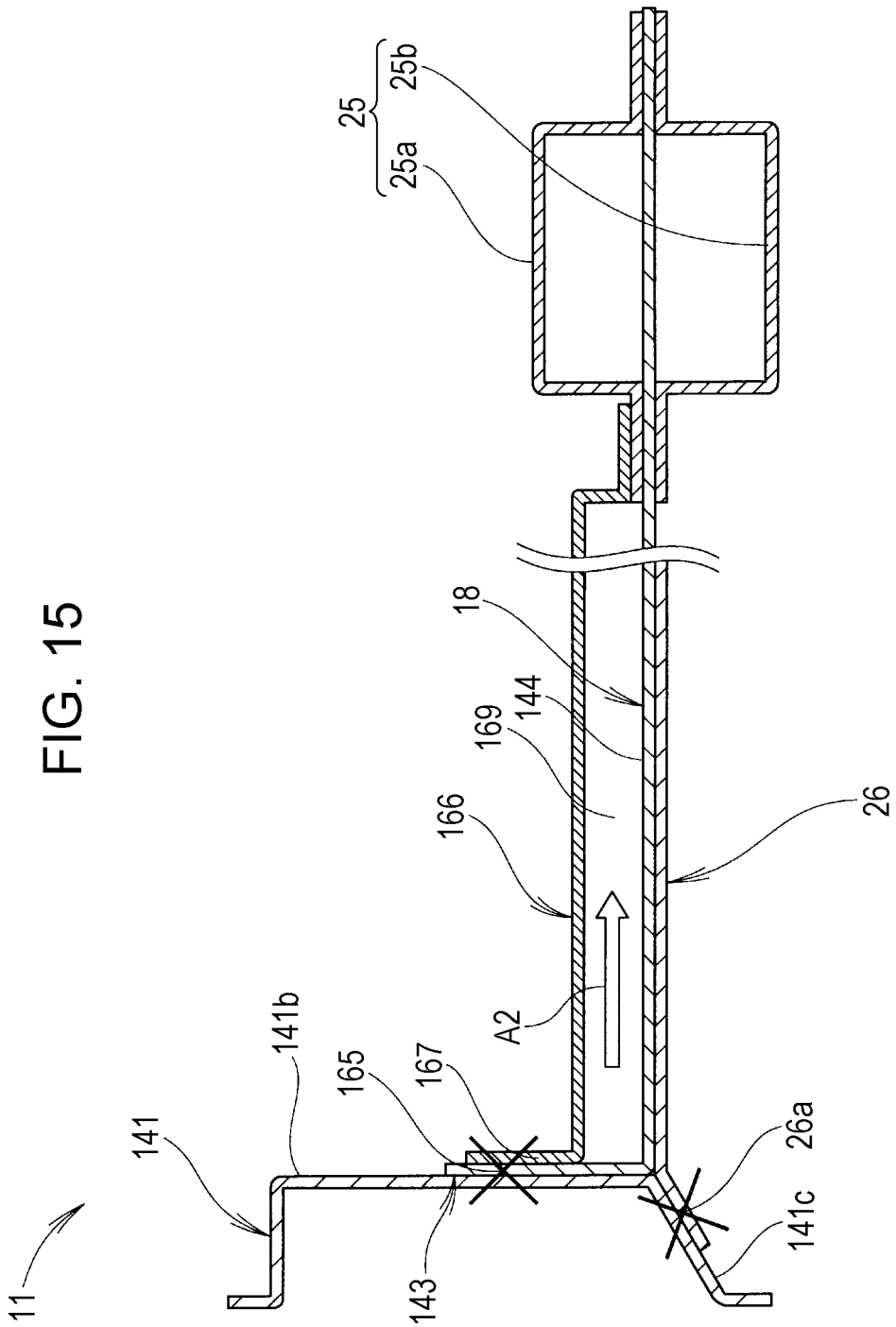
FIG. 15 is a conceptual diagram illustrating a joined state of a general face of a reinforcing plate of the structure for a front portion of a vehicle body illustrated in FIG. 14.
Figure 16:
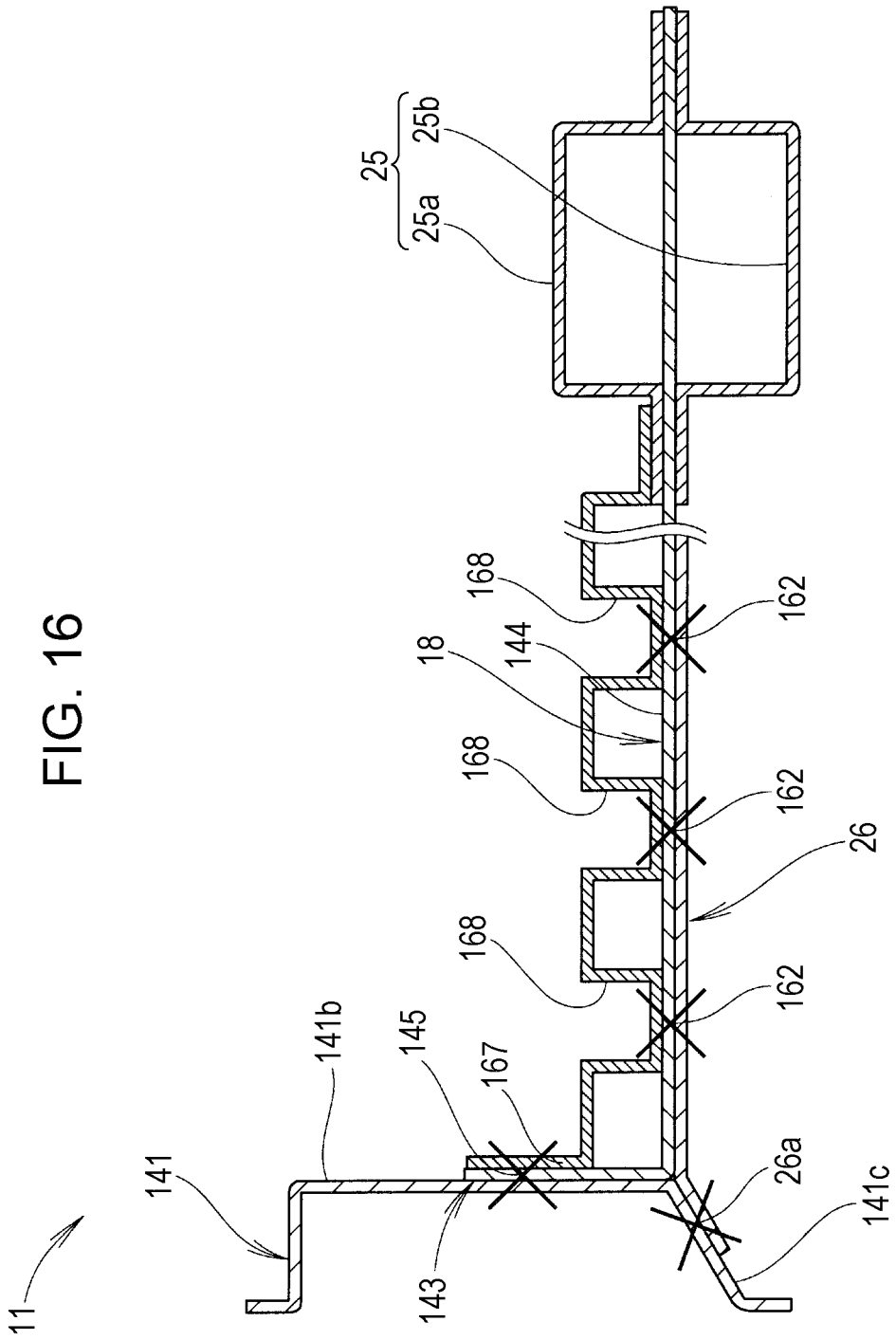
FIG. 16 is a conceptual diagram illustrating a joined state of a recessed portion of a reinforcing plate of the structure for a front portion of a vehicle body illustrated in FIG. 14.

A structure for a front portion of a vehicle body according to a second embodiment is illustrated in FIGS. 14 through 16. Parts which are the same as those of the structure for a front portion of a vehicle body according to the first embodiment, illustrated in FIGS. 1 through 13, will be denoted with the same reference numerals, and detailed description thereof will be omitted.

According to the second embodiment, the strength and rigidity of a reinforcing plate 166 is further improved by being jointed with the floor frame 25. The reinforcing plate 166 has a flange 167 formed, which is jointed to the side face 141b of the side sill inner panel 141. More specifically, the reinforcing plate 166 is spot-welded to the joint portion 143 of the side face 141b of the side sill inner panel 141 and the dashboard lower panel 18, at spot weld points 165, interposing the dashboard lower panel 18.

The reinforcing plate 166 has multiple recessed dimple-shaped portions 168 formed by indenting the reinforcing plate 166 toward the dashboard lower panel 18. The dimple-shaped portions 168 are jointed (by welding) to the outrigger 26 at a joint portion 162 interposing the dashboard lower panel 18 (footrest portion 144).

A flange 167 which is jointed at or near the joint portion 143 between the side sill inner panel 141 and dashboard lower panel 18, and an extended portion 166a of the reinforcing plate 166 which extends to the wheel house portion 101 (see FIG. 2), are formed to the reinforcing plate 166. The wheel house portion 101 is a portion formed with increased strength and rigidity due to being curved so as to protrude toward the passenger space 12 side, thus the strength and rigidity of the footrest portion 144 is further improved. That is to say, the reinforcing plate 166 extends to the wheel house portion 101 of the dashboard lower panel 18 so as to protect the legs of the passengers.

FIG. 15 illustrates a cross-sectional view of a general face of the reinforcing plate 166 where dimple-shaped portions 168 are not formed, with a closed cross-section 169 being formed between the dashboard lower panel 18 and the reinforcing plate 166. For example, in the event that a narrow-offset collision occurs, the load of the narrow-offset collision is transmitted from the outside of the reinforcing plate 166 toward the inside thereof in the width direction of the vehicle via the closed cross-section 169, as indicated by the arrow A2. Thus, the load of a narrow-offset collision is dispersed.

FIG. 16 illustrates a cross-sectional view of a reinforcing plate jointed portion of the reinforcing plate 166 where dimple-shaped portions 168 are formed, with the dimple-shaped portions 168 being jointed by welding to the outrigger 26 at a joint portion 162 interposing the dashboard lower panel 18 (footrest portion 144). Accordingly, the footrest portion 144 is integrally jointed with the reinforcing plate 166 and the outrigger 26, thereby further improving strength and rigidity. Moreover, the reinforcing plate 166 is jointed to the floor frame 25, thus strength and rigidity is further improved.

As illustrated in FIGS. 14 through 16, with the structure for a front portion of a vehicle body, the reinforcing plate 166 has been jointed with the floor frame 25, thus strength and rigidity around the footrest portion 144 of the dashboard lower panel 18 can be further improved.

While preferred embodiments have been described with reference to accompanying drawings, the subject matters of the present application should not be limited to those preferred embodiments. For example, while the cowling structure of the vehicle according to the present disclosure has so far been described as being that for a vehicle 10 which has the steering wheel on the left side, as illustrated in FIG. 1, the present disclosure is not limited to this arrangement, and the right and left configurations may be inverted for the case of a vehicle with the steering wheel on the right side.

The structure for a front portion of a vehicle body according to the present disclosure is suitably used with passenger vehicles such as sedans and station wagons.

We claim:

1. A front portion structure of a vehicle body comprising:
   a dashboard lower panel extending in a vehicle width direction, the dashboard lower panel being a partition between an engine room and a passenger space of the vehicle body;
   a front side frame extending in a longitudinal direction of the vehicle body to intersect the dashboard lower panel under the dashboard lower panel;
   an outrigger provided under the dashboard lower panel and extending outwards from the front side frame in the vehicle width direction;
   a side sill extending from an outer portion of the outrigger in the vehicle width direction, toward the back of the vehicle body, the side sill including a side sill inner panel;
   a footrest portion serving as a footrest for a passenger, formed as a part of the dashboard lower panel; and
   a reinforcing plate covering the footrest portion from a passenger space side thereof to reinforce the footrest portion, and joined to the dashboard lower panel,
   wherein the dashboard lower panel includes a dashboard lower flange joined to a side surface of the side sill inner panel of the side sill, and
   wherein the reinforcing plate includes a flange joined to the side surface of the side sill inner panel of the side sill.

2. The front portion structure according to claim 1, wherein the flange includes a linearly extending bead shape portion.

3. The front portion structure according to claim 1, wherein the reinforcing plate includes a plurality of recess-shaped portions formed by indenting the reinforcing plate toward the dashboard lower panel, the recess-shaped portions being fixedly joined to the dashboard lower panel.

4. The front portion structure according to claim 1, further comprising a floor frame formed on the inner side of the front side frame in the vehicle width direction and extending toward the back of the vehicle body along the side sill,
   wherein the reinforcing plate is joined to the floor frame.

5. The front portion structure according to claim 1, wherein the reinforcing plate is joined to the outrigger.

6. The front portion structure according to claim 1 further comprising a wheel house, wherein the dashboard lower panel includes a wheel house portion forming a rear part of the wheel house, and the reinforcing plate extending to the wheel house portion.

7. The front portion structure according to claim 1 further comprising a dashboard lower carpet covering the dashboard lower panel from the passenger space side thereof,
   wherein the dashboard lower carpet includes the footrest integrally formed thereto, protruding toward the passenger space to include a space therein, the reinforcing plate being disposed at a position corresponding to the space of the footrest.

8. The front portion structure according to claim 1, wherein the reinforcing plate is joined to the dashboard lower panel to form a closed cross-section therebetween.

9. The front portion structure according to claim 2, wherein the dashboard lower panel and the side sill inner panel are joined to each other to form a joined portion thereof, and the linearly extending bead shape portion is disposed at or near the joined portion.

10. The front portion structure according to claim 4, wherein the dashboard lower panel includes the flange at one end thereof in the vehicle width direction and is joined to the floor frame at the other end thereof.

11. The front portion structure according to claim 3, wherein the recess-shaped portions are fixedly joined to the outrigger under the dashboard lower panel via the dashboard lower panel therebetween.

* * * * *